G. H. BENJAMIN.
METHOD OF EXTRACTING SUGAR FROM DRIED SUGAR BEETS.
APPLICATION FILED APR. 6, 1915.
1,319,320.  Patented Oct. 21, 1919.
2 SHEETS—SHEET 1.
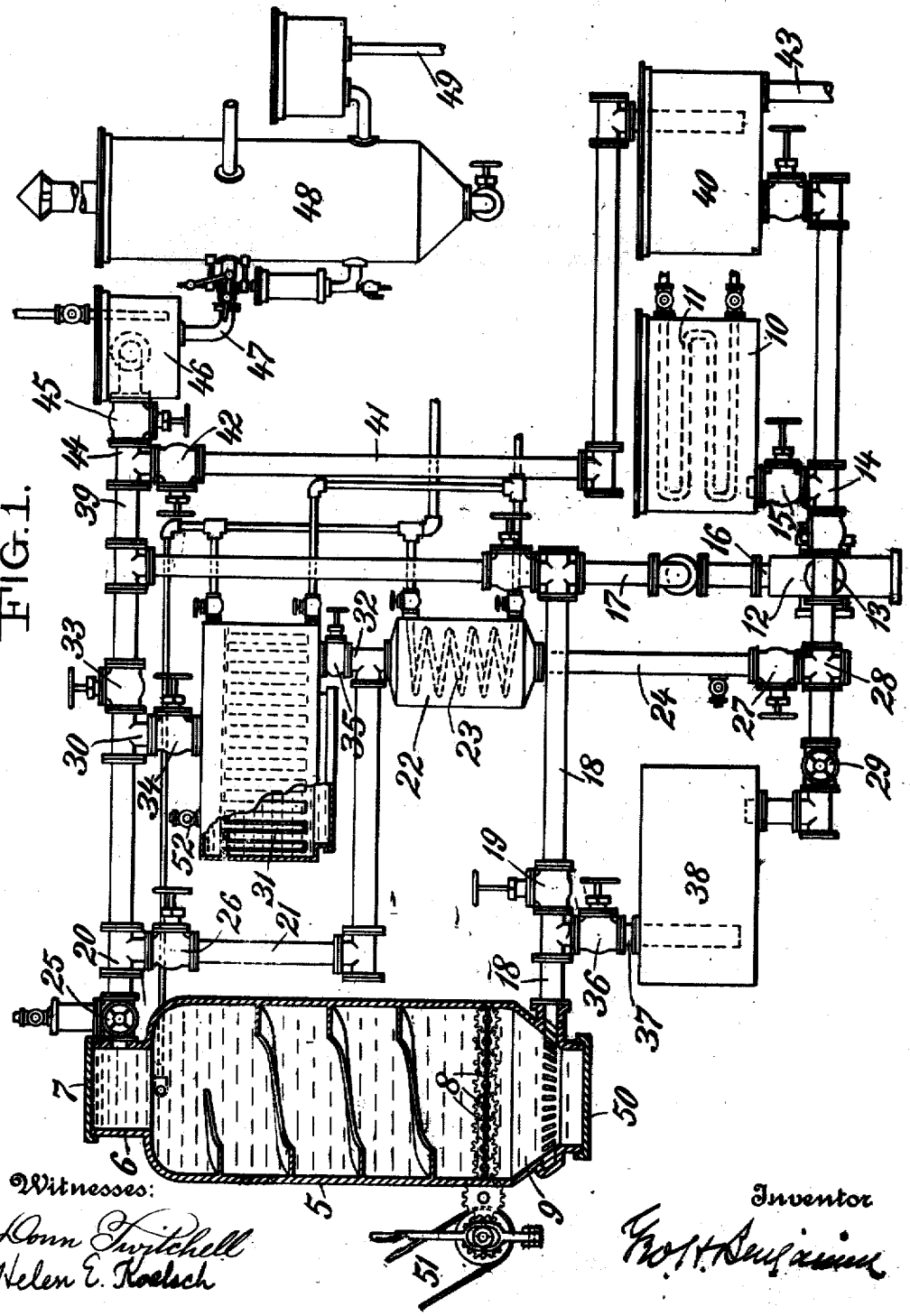

G. H. BENJAMIN.
METHOD OF EXTRACTING SUGAR FROM DRIED SUGAR BEETS.
APPLICATION FILED APR. 6, 1915.
1,319,320.
Patented Oct. 21, 1919.
2 SHEETS—SHEET 2.
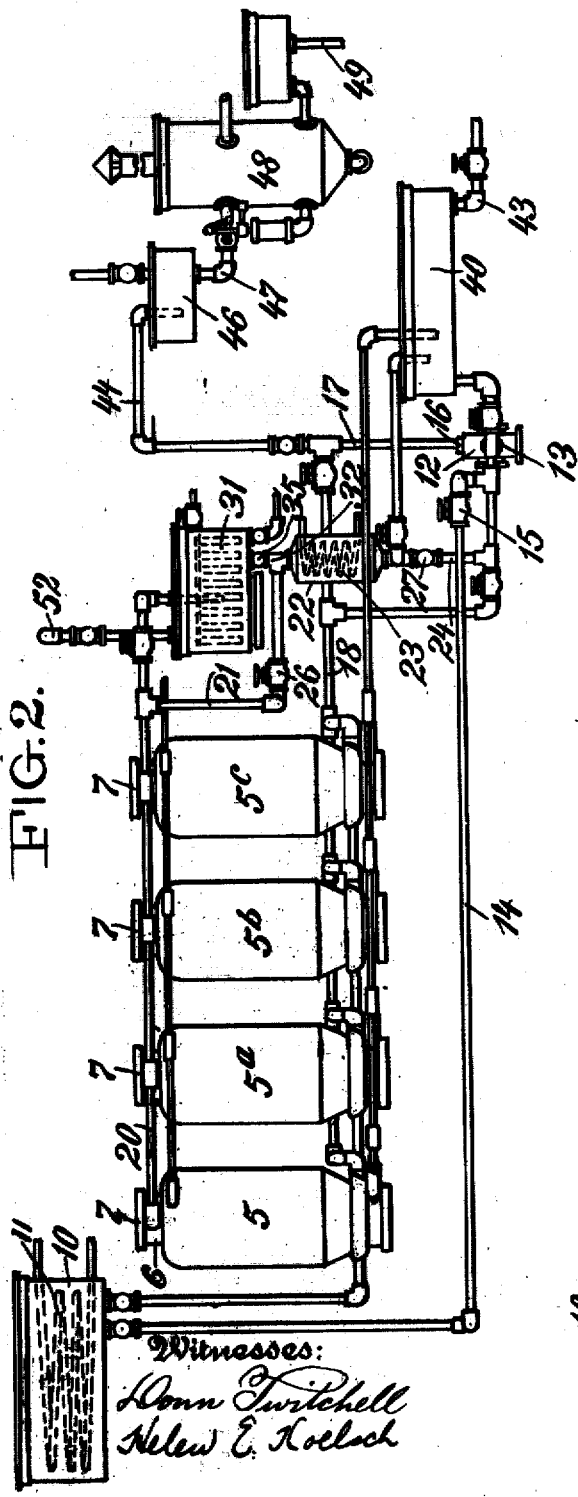
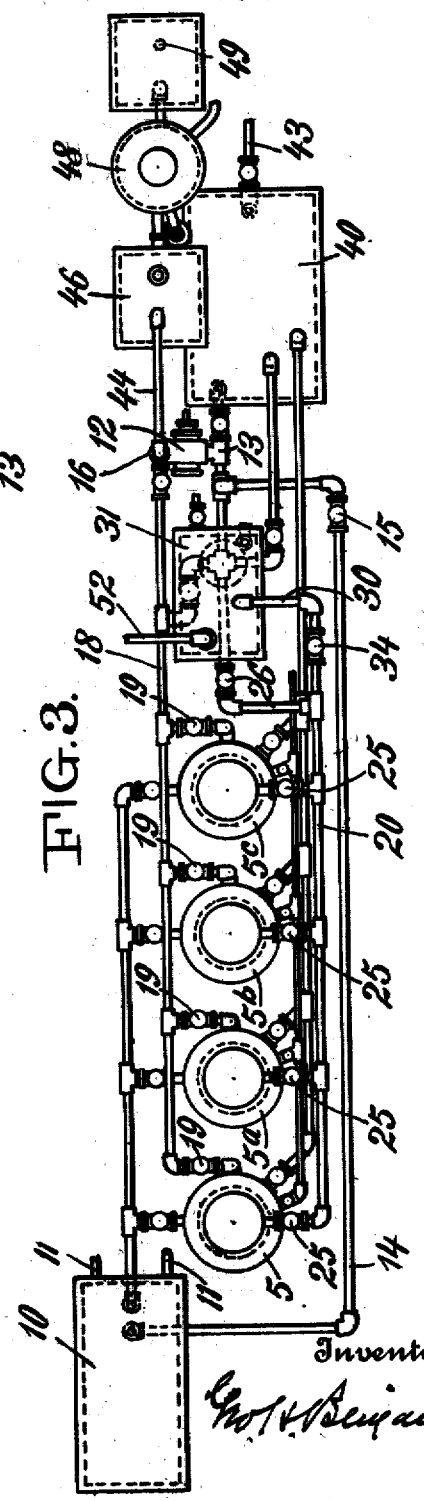

UNITED STATES PATENT OFFICE.

GEORGE HILLARD BENJAMIN, OF NEW YORK, N. Y.

METHOD OF EXTRACTING SUGAR FROM DRIED SUGAR-BEETS.

1,319,320.                    Specification of Letters Patent.      Patented Oct. 21, 1919.

Application filed April 6, 1915. Serial No. 19,458.

*To all whom it may concern:*

Be it known that I, GEORGE HILLARD BENJAMIN, a citizen of the United States, residing at New York, in the county and State of New York, have invented certain new and useful Improvements in Methods of Extracting Sugar from Dried Sugar-Beets, of which the following is a specification.

My invention relates to a method of extracting sugar from "dried sugar beets," and has for its object to decrease the cost of extraction or diffusion, as heretofore practised, by decreasing the time required to effect diffusion, the amount of water employed, and the fuel required to heat the diffusion fluid, as also to dry the residual products.

By the term "dried sugar beets" as used in this specification, I wish to have understood sugar beets which have been divided or separated into cossettes or similar bodies, and such bodies subjected to treatment whereby there has been removed, at least 80% of the normally contained water, the albuminous or similar bodies being coagulated both within and without the cells of the beet structure; and further, wherein the crystallizable sugar carried by the dried sugar beet is in excess of that carried by the fresh beet before treatment. The method of treating the beets as above indicated, the analyses and methods of carrying out the analyses upon which the statement is predicated, i. e., that the crystallizable sugar carried by the dried sugar beets is in excess of that carried by the fresh beets before treatment, I have specifically set forth and described in my prior Patent No. 1,207,840, dated December 12, 1916, and to which reference is made.

The accompanying drawings, which are in a sense diagrammatic, will serve to illustrate such an apparatus as I may use to carry my method into effect, in which Figure 1 is a general view in elevation, with a diffuser shown in section and a filter in partial section. Fig. 2 is a vertical elevation, showing a modified arrangement of apparatus where a series of diffusing cells are employed. Fig. 3 is a plan view of the arrangement shown in Fig. 2.

To carry my invention into effect, the "dried sugar beets," in the form of cossettes or other divided bodies, are introduced into a diffuser 5 through the usual opening 6 in the top of the diffuser, which in the drawings is shown as covered by a cap 7. As the weight of the dried sugar beets is approximately one quarter that of fresh beets, and as they occupy approximately one half the space of fresh beets, I prefer to half fill the diffuser with the beets, as by so doing, when hot water is introduced into the diffuser, the beets will swell sufficiently to fill the diffuser. I wish it understood, however, that I do not limit myself in any wise to the amount of dried beets which I may introduce into the diffuser. That is, I may introduce a less or greater amount of beets, depending upon circumstances. The beets when introduced into the diffuser, are supported by a perforated grate 8, leaving a space 9 between the bottom of the grate and the bottom of the diffuser. After the beets are introduced into the diffuser, hot water is introduced into the diffuser below the grate from the tank 10. In Fig. 1 the tank is situated below the diffuser, and in Fig. 2 above the diffusers. Provision is made for heating the water in tank 10 by means of a steam coil 11.

I prefer that the temperature of the water should be originally, and maintained, at approximately 158° Fahrenheit, which is the temperature found to be best suited for the purpose. I do not, however, limit myself to such temperature. It may be decreased or increased as required.

12 indicates a pump. The induction orifice 13 of the pump is connected to the bottom of the tank 10 through a pipe 14 in which is a valve 15. The water drawn from the tank 10 is delivered from the eduction orifice 16 of the pump through pipes 17—18 into the bottom of the diffuser. In the pipe 18 is a valve 19. The hot water introduced into the diffuser is endosmotically absorbed by the dried beets, filling the cells of such dried beets, and causing the beets to swell. As the beets swell, further water is introduced from the tank 10, the surplus of water passing out at the top of the diffuser through the pipes 20—21, a heater 22 provided with a heating coil 23, and pipe 24. In the pipe 20 is a valve 25;

in pipe 21, a valve 26; in pipe 24, a valve 27. At such times the valves 25 and 26 are opened and the valve 27 closed.

As soon as the circulating system as above described is filled with water, the valve 15 in pipe 14 is closed, thereby shutting off the tank 10, and the valve 27 in pipe 24 is opened, which allows the water to pass through the pipe 28 to the induction orifice 13 of the pump 12. In the pipe 28 is a valve 29, which at such time is closed. The water is then circulated by the pump, passing from the eduction orifice of the pump to the diffuser, through the diffuser, through the heater to the induction orifice of the pump. By means of the heater 22 the temperature of the water is maintained. The circulation, as above described, is maintained for any required length of time. In practice it has been found that the circulation should be maintained for approximately one and a half hours. I do not, however, limit myself to the length of time during which the circulation should be maintained.

After circulating the water through the beets in the diffuser, as described, the fluid can be tested, and if it is found that it has picked up colloidal and other substances, which it is desirable to remove, the valve 26 in pipe 21 is closed. The circulation will then be through the pipe 20 and pipe 30, to filter 31, through pipe 32, to heater 22. In the pipe 20 there is a valve 33 which at such time is closed, and in the pipe 30 there is a valve 34 which at such time is open. In pipe 32 there is a valve 35 which is also open. The diffusion fluid in passing through the filter, which may be of any suitable type, has separated from it the colloidal substances, etc., the sugar passing through the filter. Circulation through the filter, as described, may be for any required time; in general practice, it is sufficient to send the solution through the filter, say three times. I do not, however, limit myself to the number of times that the fluid is sent through the filter.

After the circulating fluid has taken up all the sugar that it will take up, the circulation is stopped. The valve 25 in pipe 20, and valve 19 in pipe 18, are then closed, and the valve 36 in pipe 37 opened. The liquid in the diffuser 5 then flows into the tank 38. The valve 29 in the pipe 28 is then opened. The valve 27 in the pipe 24 at that time being closed, and the fluid flows from the tank 38, through the pipe 28, to the induction orifice 13 of the pump, and thence from the eduction orifice 16 and through pipe 17 to pipe 39, the valve 33 in pipe 20 being at such time closed, and thence (depending upon the character of the fluid) either to the tank 40 through pipe 41 in which is a valve 42 which at such time is open. From the tank 40 the fluid is drawn through pipe 43 to the usual triple effect apparatus; or alternatively, the valve 42 at such time being closed, through pipe 44 in which is a valve 45, which is then open, to a tank 46, and through a pipe 47 to a carbonatation apparatus 48, and from thence through pipe 49, to the "triple effect." The carbonatation apparatus illustrated in the drawings is substantially that described in the patent of Leon Naudet, No. 746,735 dated Dec. 15, 1903. I do not limit myself to any particular form of carbonatation apparatus.

After the diffuser 5 has been emptied of the fluid, the cap 50 at the bottom of the diffuser is removed and the members of the grate 8 rotated from a source of power, indicated at 51. If desired, through the instrumentality of the apparatus as above described, fresh water may be introduced into the diffuser before the exhausted cossettes are removed, to obtain sweet waters which may be discharged in tank 38, to serve as the preliminary circulation fluid.

In Figs. 2 and 3 four diffusers are shown. These diffusers are shown arranged in parallel relation. In carrying my improved method into effect, it is convenient to first introduce water into one diffuser, for instance, diffuser 5, and then leave the water in that diffuser until the beets are swollen. In the meantime, circulation is effected through diffuser $5^a$. Diffuser $5^b$ may at such time be discharged and $5^c$ opened for the introduction of fresh cossettes. I do not limit myself to the number of diffusers which may be employed. In practice I have found that circulation through one diffuser at a time is sufficient. It may, however, be found desirable to employ two or more diffusers in series, and circulate the fluid through them in successive order. I have not shown such an arrangement, as it is well known in the art and merely means a rearrangement of the circulating pipe system.

In carrying my improved method into effect, I may, before the circulated fluid containing all the sugar which may be extracted is discharged into the tank 40, effect a partial defecation by introducing into the filter 31 through pipe 52, a defecating solution, as for instance, a solution of mono-calcic phosphate and water, the effect of which is to coagulate and throw down in the filter, such bodies carried by the fluid, as are subject to the action of the mono-calcic phosphate. When this step is taken, the resultant fluid should not be re-sent through the diffusers, but carried directly to the tank 40, or to the carbonatation apparatus 48, for the reason that it is not advisable to introduce the liquid containing any trace of mono-calcic phosphate into the exhausted cossettes, as it decreases the value of the cossettes as a food product for cattle. Suitable steam pipes are shown as connected to the filter 31, diffuser 5 and heater 22.

From the above it will be seen that the steps of the method described, are:

First: Introducing water at a constant temperature to the dried cossettes to cause heating of the cossettes, endosmosis of the water, and consequent swelling of the cossettes.

Second: Circulating the fluid to extract the sugar from the beets, as well as such other materials as will be picked up by the circulating fluid.

Third: Filtering the fluid while circulating, to remove such matters as may be removed by the filter.

Fourth: Subjecting the fluid in the filter to the action of a defecating body, such as mono-calcic phosphate to precipitate or coagulate bodies carried by the fluid, other than the sugar.

Fifth: Delivering the fluid with the extracted sugar to a tank from which it may be fed to a "triple effect" apparatus; or alternatively, when necessary, to a carbonatation apparatus to separate such bodies as may be separated by the action of lime, as is usual.

The theoretical considerations involved are as follows: When the hot water is brought into contact with the dried beets, the water is absorbed by the beets and fills the cells of the beets, thereby plumping them and bringing them back to their natural condition. As the water is absorbed into the cells, it picks up the sugar within the cells and under the influence of heat, an exosmotic pressure is developed whereby the sugar and other bodies will pass through the cell membranes into the diffusion fluid. The colloidal bodies as well as the other bodies which have been coagulated by the preliminary treatment to which the beets were subjected, do not pass through the cell walls, at any rate, not to the same degree that they pass in the ordinary diffusion methods. The result is a fluid which contains practically all of the sugar which may be extracted, a small proportion of the salts carried by the beets (which proportion is smaller than in ordinary diffusion, owing to the fact that a portion of the salts are held or bound by the colloidal or coagulated matters and therefore do not escape from the cells) which fluid is bright and sparkling and which may be carried directly to the "triple effect" without carbonatation, or where carbonatation is required, the percentage of lime used is very much less than is used in the carbonatation of sugar fluid obtained by the ordinary diffusion processes. It will be noted, that by limiting the circulation to a single cell or single cells successively, the amount of water required to effect diffusion is materially decreased, and consequently the sugar fluid is in a much more concentrated condition, thereby requiring less heat to effect crystallization and maintain the temperature of the circulating fluid.

Having thus described my invention, I claim:

1. A method of extracting sugar from dried sugar beets, which consists in first subjecting beets from which the major portion of the normally contained water has been removed to the action of hot water without circulation, for a sufficient time to heat the beets to the required temperature and to effect endosmotic absorption of the hot water by the cells of the beets, then introducing more hot water and circulating such hot water at a constant temperature through the beets, for a sufficient time to extract approximately all of the sugar which may be extracted by the introduced water.

2. A method of extracting sugar from drier sugar beets, which consists in first subjecting beets from which the major portion of the normally contained water has been removed to the action of water heated to approximately 158° Fahrenheit and without circulation of the water, for a sufficient time to heat the beets to the required temperature and to effect endosmotic absorption of the water by the cells of the beets, then introducing further water and circulating such water heated to and maintained at a temperature of 158° Fahrenheit through the beets for a sufficient time to extract approximately all of the sugar which may be extracted by such water.

3. A method of extracting sugar from dried sugar beets, which consists in first subjecting beets from which the major portion of the normally contained water has been removed to the action of water heated to and maintained at a constant temperature and for a sufficient time to heat the beets to the required temperature and effect endosmotic absorption of the water by the cells of the beets; then circulating further water through the beets at the required temperature and for a sufficient time to extract approximately all of the sugar which may be extracted by the water, and simultaneously filtering the sugar liquid during the circulation.

4. A method of extracting sugar from dried sugar beets, which consists in first subjecting beets from which the major portion of the normally contained water has been removed to the action of water heated to and maintained at a constant temperature and for a sufficient time to heat the beets to the required temperature and effect endosmotic absorption of the water by the cells of the beets; then circulating further water through the beets at the required temperature and for a sufficient time to extract approximately all of the sugar which may be extracted by the water, simultaneously filtering the sugar liquid, and finally treating to remove foreign bodies before delivery to the concentration apparatus.

In testimony whereof, I affix my signature, in the presence of two witnesses.

GEORGE HILLARD BENJAMIN.

Witnesses:
HELEN E. HOLLSCH,
HARRY TERHUNE.